(12) United States Patent
Akebono et al.

(10) Patent No.: US 8,725,333 B2
(45) Date of Patent: May 13, 2014

(54) CONTROL APPARATUS FOR VEHICLE AND CONTROL METHOD THEREFOR

(75) Inventors: Hiromichi Akebono, Machida (JP); Hideharu Yamamoto, Fujinomiya (JP); Kota Miura, Isehara (JP); Hisashi Saito, Shizuoka (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 62 days.

(21) Appl. No.: 13/283,954

(22) Filed: Oct. 28, 2011

(65) Prior Publication Data
US 2012/0109439 A1 May 3, 2012

(30) Foreign Application Priority Data

Nov. 1, 2010 (JP) ................................ 2010-245721

(51) Int. Cl.
*B60W 10/02* (2006.01)

(52) U.S. Cl.
USPC ............................................. 701/22; 701/68

(58) Field of Classification Search
USPC ......... 701/22, 66–68; 477/93, 114; 192/220.1
See application file for complete search history.

(56) References Cited

U.S. PATENT DOCUMENTS

| | | | |
|---|---|---|---|
| 5,361,213 A | 11/1994 | Fujieda et al. | |
| 5,697,479 A | 12/1997 | Kono et al. | |
| 5,800,308 A * | 9/1998 | Tsutsui et al. | 477/116 |
| 5,871,419 A * | 2/1999 | Amendt | 477/180 |
| 5,916,058 A * | 6/1999 | Sakai et al. | 477/114 |
| 5,944,632 A | 8/1999 | Hara et al. | |
| 6,022,295 A * | 2/2000 | Liu | 477/180 |
| 6,033,340 A * | 3/2000 | Amendt et al. | 477/77 |
| 6,033,342 A | 3/2000 | Steinel et al. | |
| 6,110,072 A | 8/2000 | Harada et al. | |
| 6,135,919 A | 10/2000 | Shimakura | |
| 6,253,137 B1 | 6/2001 | Abo et al. | |

(Continued)

FOREIGN PATENT DOCUMENTS

| | | | | |
|---|---|---|---|---|
| EP | 1 972 833 A2 | 9/2008 | | |
| JP | 60136662 A * | 7/1985 | ............. F16H 41/24 |

(Continued)

OTHER PUBLICATIONS

JPO machine translation of JP 2001-18690 (original JP document published Jan. 23, 2001).*

(Continued)

*Primary Examiner* — Behrang Badii
*Assistant Examiner* — David Testardi
(74) *Attorney, Agent, or Firm* — Foley & Lardner LLP

(57) ABSTRACT

In control apparatus and method for a vehicle, the vehicle including a traveling mode (a WSC traveling mode) in which a slip control is performed for a clutch (second clutch CL2) and a revolution speed control is performed for the driving source such that a revolution speed at a driving source side of the clutch becomes higher than that at a driving wheel side of the clutch by a predetermined revolution speed, an actual torque of a driving source of the vehicle is detected, a command hydraulic pressure is reduced from an initial command hydraulic pressure and a post-correction command hydraulic pressure is set on a basis of the command hydraulic pressure when a variation in the actual torque of the driving source along with the reduction of the command hydraulic pressure is determined to end, when a vehicle stopped state is determined to occur during the traveling mode.

10 Claims, 10 Drawing Sheets

(56) References Cited

U.S. PATENT DOCUMENTS

| | | | |
|---|---|---|---|
| 6,494,810 B1 * | 12/2002 | Mack et al. | 477/174 |
| 6,527,672 B1 | 3/2003 | Henneken et al. | |
| 6,565,473 B2 | 5/2003 | Endo et al. | |
| 6,602,160 B2 | 8/2003 | Tsutsui | |
| 6,658,341 B2 * | 12/2003 | Inoue et al. | 701/67 |
| 6,769,502 B2 | 8/2004 | Nakamori et al. | |
| 7,089,095 B2 * | 8/2006 | Takami et al. | 701/22 |
| 7,226,383 B2 | 6/2007 | Namba | |
| 7,359,785 B2 * | 4/2008 | Yoshida et al. | 701/53 |
| 7,404,460 B2 | 7/2008 | Oshidari | |
| 7,465,250 B2 | 12/2008 | Tamai et al. | |
| 7,610,891 B2 | 11/2009 | Seufert et al. | |
| 7,730,982 B2 * | 6/2010 | Hidaka et al. | 180/65.265 |
| 7,828,096 B2 | 11/2010 | Hoher et al. | |
| 8,037,858 B2 | 10/2011 | Seufert et al. | |
| 8,108,115 B2 | 1/2012 | Kobayashi et al. | |
| 8,170,762 B2 | 5/2012 | Foster et al. | |
| 8,187,151 B2 | 5/2012 | Gloge | |
| 8,216,112 B2 | 7/2012 | Gibson et al. | |
| 8,297,249 B2 | 10/2012 | Seufert et al. | |
| 8,393,998 B2 | 3/2013 | Akebono et al. | |
| 2002/0107103 A1 | 8/2002 | Nakamori et al. | |
| 2004/0157704 A1 | 8/2004 | Stork et al. | |
| 2005/0102082 A1 | 5/2005 | Joe et al. | |
| 2005/0215393 A1 | 9/2005 | Shimoda | |
| 2005/0222735 A1 | 10/2005 | Usuki et al. | |
| 2007/0142142 A1 | 6/2007 | Yamaguchi et al. | |
| 2007/0204817 A1 | 9/2007 | Russell et al. | |
| 2008/0011529 A1 | 1/2008 | Hoher et al. | |
| 2008/0017427 A1 | 1/2008 | Nakanowatari | |
| 2008/0220937 A1 | 9/2008 | Nozaki et al. | |
| 2009/0112423 A1 | 4/2009 | Foster et al. | |
| 2009/0143189 A1 | 6/2009 | Hasegawa et al. | |
| 2010/0018808 A1 | 1/2010 | Gloge | |
| 2010/0056328 A1 | 3/2010 | Schenk et al. | |
| 2010/0197451 A1 | 8/2010 | Kaltenbach et al. | |
| 2010/0204862 A1 | 8/2010 | Uejima et al. | |
| 2011/0082630 A1 | 4/2011 | Kawaguchi et al. | |
| 2011/0256978 A1 | 10/2011 | Falkenstein | |
| 2011/0276207 A1 | 11/2011 | Falkenstein | |
| 2012/0105925 A1 | 5/2012 | Shirai et al. | |
| 2012/0108388 A1 | 5/2012 | Akebono et al. | |
| 2012/0109438 A1 | 5/2012 | Akebono et al. | |
| 2012/0109439 A1 | 5/2012 | Akebono et al. | |
| 2012/0203406 A1 | 8/2012 | Akebono et al. | |
| 2013/0218391 A1 | 8/2013 | Aizawa et al. | |
| 2013/0218392 A1 | 8/2013 | Aizawa et al. | |

FOREIGN PATENT DOCUMENTS

| | | | | |
|---|---|---|---|---|
| JP | 2000-170888 A | | 6/2000 | |
| JP | 2001018690 A | * | 1/2001 | B60K 41/28 |
| JP | 2010-077981 A | | 4/2010 | |
| JP | 2010-179860 A | | 8/2010 | |
| JP | 2010195363 A | * | 9/2010 | |

OTHER PUBLICATIONS

U.S. Appl. No. 13/281,939, filed Oct. 26, 2011, Nagashima et al.
U.S. Appl. No. 13/283,991, filed Oct. 28, 2011, Akebono et al.
U.S. Appl. No. 13/283,938, filed Oct. 28, 2011, Akebono et al.
U.S. Appl. No. 13/283,974, filed Oct. 28, 2011, Akebono et al.
U.S. Appl. No. 13/283,909, filed Oct. 26, 2011, Mochiyama et al.
U.S. Appl. No. 13/281,990, filed Oct. 28, 2011, Mochiyama et al.
H. Akebono, U.S. PTO Notice of Allowance, U.S. Appl. No. 13/283,974, dated Nov. 23, 2012, 13 pages.
S. Mochiyama, U.S. PTO Office Action, U.S. Appl. No. 13/281,990, dated Nov. 30, 2012, 10 pages.
H. Akebono, U.S. PTO Notice of Allowance, U.S. Appl. No. 13/283,938, dated Dec. 28, 2012, 14 pages.
H. Akebono, U.S. PTO Office Action, U.S. Appl. No. 13/283,991, dated Mar. 14, 2013, 10 pages.
U.S. Appl. No. 13/361,640, filed Jan. 30, 2012, Akebono et al.
S. Mochiyama, U.S. PTO Office Action, U.S. Appl. No. 13/283,909, dated May 3, 2012, 12 pages.
S. Mochiyama, U.S. PTO Office Action, U.S. Appl. No. 13/281,990, dated May 10, 2013, 10 pages.
H. Akebono, U.S. PTO Notice of Allowance, U.S. Appl. No. 13/283,991, dated Jul. 9, 2013, 10 pages.
S. Mochiyama, U.S. PTO Office Action, U.S. Appl. No. 13/281,990, dated Sep. 9, 2013, 12 pages.
S. Mochiyama, U.S. PTO Office Action, U.S. Appl. No. 13/283,909, dated Sep. 10, 2013, 9 pages.
F. Nagashima, U.S. PTO Notice of Allowance, U.S. Appl. No. 13/281,939, dated Sep. 23, 2013, 19 pages.
S. Mochiyama, U.S. PTO Notice of Allowance, U.S. Appl. No. 13/283,909, dated Dec. 27, 2013 12 pages.
H. Akebono, U.S. PTO Notice of Allowance, U.S. Appl. No. 13/361,640, dated Oct. 30, 2013, 20 pages.

* cited by examiner

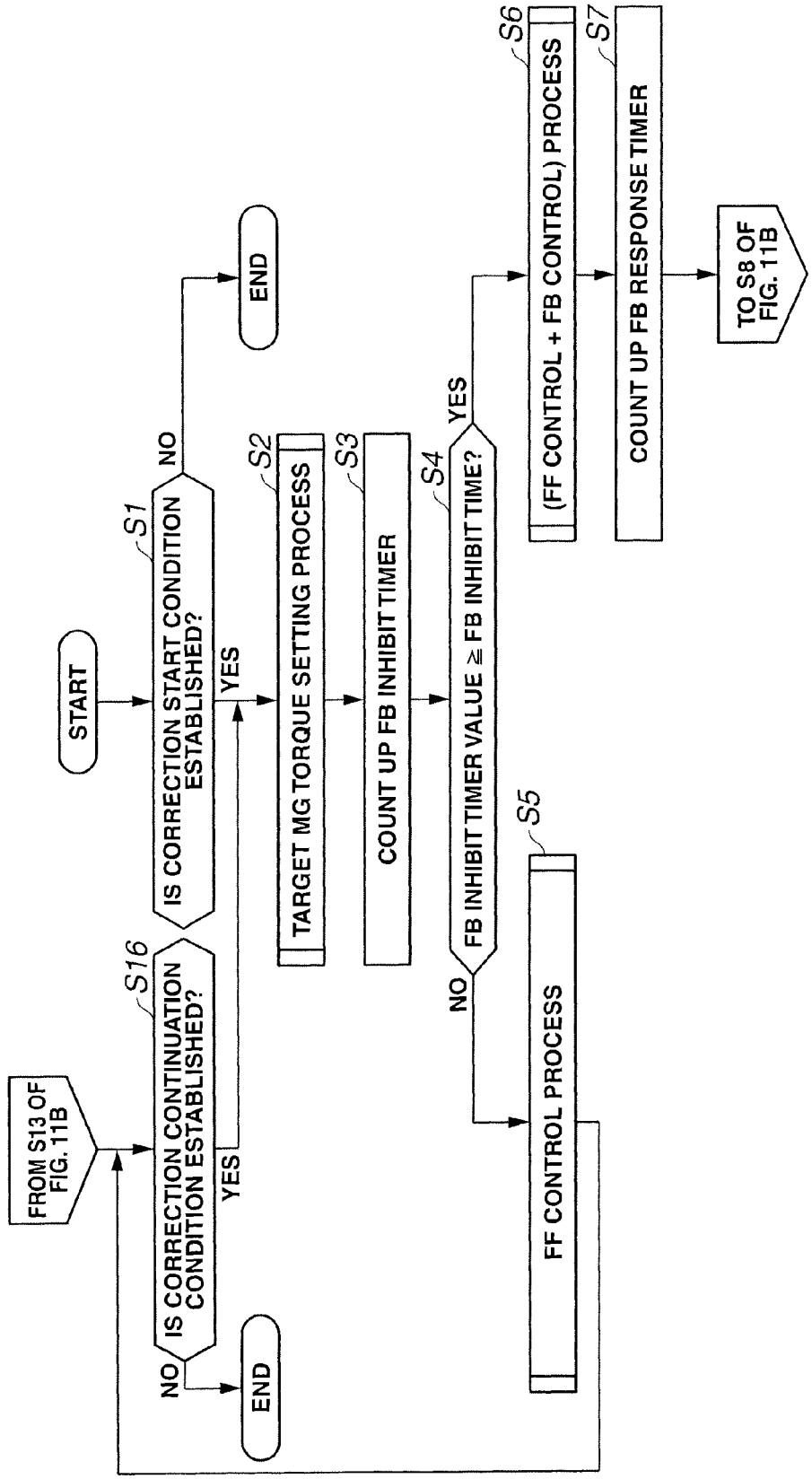

# US 8,725,333 B2

CONTROL APPARATUS FOR VEHICLE AND CONTROL METHOD THEREFOR

BACKGROUND OF THE INVENTION (1) Field of the Invention

The present invention relates to a control apparatus for a vehicle and a control method therefor in which a slip control for an engagement element disposed between a power source (driving source) and driving wheels is performed.

(2) Description of related art

A Japanese Patent Application First Publication No. 2010-077981 published on Apr. 8, 2010 exemplifies a previously proposed control apparatus for a vehicle. This Patent Application Publication describes a technique carrying out an engine use slip mode (hereinafter, referred to as a WSC (Wet Start Clutch) traveling mode) in which driving forces of both of an engine and a motor are used to start the vehicle while slipping a clutch intervened between the motor and driving wheels.

SUMMARY OF THE INVENTION

However, when a vehicle driver depresses a brake pedal so that the vehicle is in the vehicle stopped state during the WSC traveling mode, the slip state of the clutch is continued so that there is a possibility of a heat generation of the clutch and a deterioration thereof. Hence, it can be thought that an input torque to the clutch is reduced to suppress the heat generation of the clutch. However, if a hydraulic pressure supplied to the clutch is excessively reduced, there is a possibility that a state in which the clutch is released toward a more released side from a state in which a transmission torque capacity of the clutch becomes substantially zero (corresponding to a generation start point of the transmission torque capacity) occurs. When, in this state, the vehicle driver releases the brake pedal and depresses an accelerator pedal to start the vehicle, a considerable time is taken for the clutch to start to have the transmission torque capacity so that a delay in the vehicle start, a start shock, and so forth occur. Consequently, there is a possibility of reduction in drive-ability of the vehicle.

It is, therefore, an object of the present invention to provide a control apparatus for a vehicle and a control method therefor which are capable of improving the drive-ability while the engagement element between the driving source and the driving wheels is suppressed from being heat generated and being deteriorated.

According to one aspect of the present invention, there is provided a control apparatus for a vehicle, comprising: a driving source which outputs a driving force to the vehicle; a clutch interposed between the driving source and driving wheels of the vehicle to generate a transmission torque capacity on a basis of a command hydraulic pressure; a traveling mode in which a slip control is performed for the clutch and a revolution speed control is performed for the driving source such that a revolution speed at a driving source side of the clutch becomes higher than that at a driving wheel side of the clutch by a predetermined revolution speed; a vehicle stop state determining section configured to determine a vehicle stopped state; a torque detecting section configured to detect an actual torque of the driving source; and a vehicle stop-time transmission torque capacity correcting section configured to reduce the command hydraulic pressure from an initial command hydraulic pressure and to set a post-correction command hydraulic pressure on a basis of the command hydraulic pressure when a variation in the actual torque of the driving source along with the reduction of the command hydraulic pressure is determined to end, when the vehicle stopped state is determined to occur during the traveling mode.

According to another aspect of the present invention, there is provided a control method for a vehicle, the vehicle comprising: a driving source which outputs a driving force to the vehicle; a clutch interposed between the driving source and driving wheels of the vehicle to generate a transmission torque capacity on a basis of a command hydraulic pressure; and a traveling mode in which a slip control is performed for the clutch and a revolution speed control is performed for the driving source such that a revolution speed at a driving source side of the clutch becomes higher than that at a driving wheel side of the clutch by a predetermined revolution speed, the control method comprising: determining a vehicle stopped state; detecting an actual torque of the driving source; and reducing the command hydraulic pressure from an initial command hydraulic pressure and setting a post-correction command hydraulic pressure on a basis of the command hydraulic pressure when a variation in the actual torque of the driving source along with the reduction of the command hydraulic pressure is determined to end, when the vehicle stopped state is determined to occur during the traveling mode.

BRIEF DESCRIPTION OF THE DRAWINGS

FIGS. 11A and 11B are integrally a flowchart representing a vehicle stop time transmission torque capacity correction control process in the preferred embodiment shown in FIG. 1.

DETAILED DESCRIPTION OF THE INVENTION

Reference will hereinafter be made to the drawings in order to facilitate a better understanding of the present invention.

Figure 1:
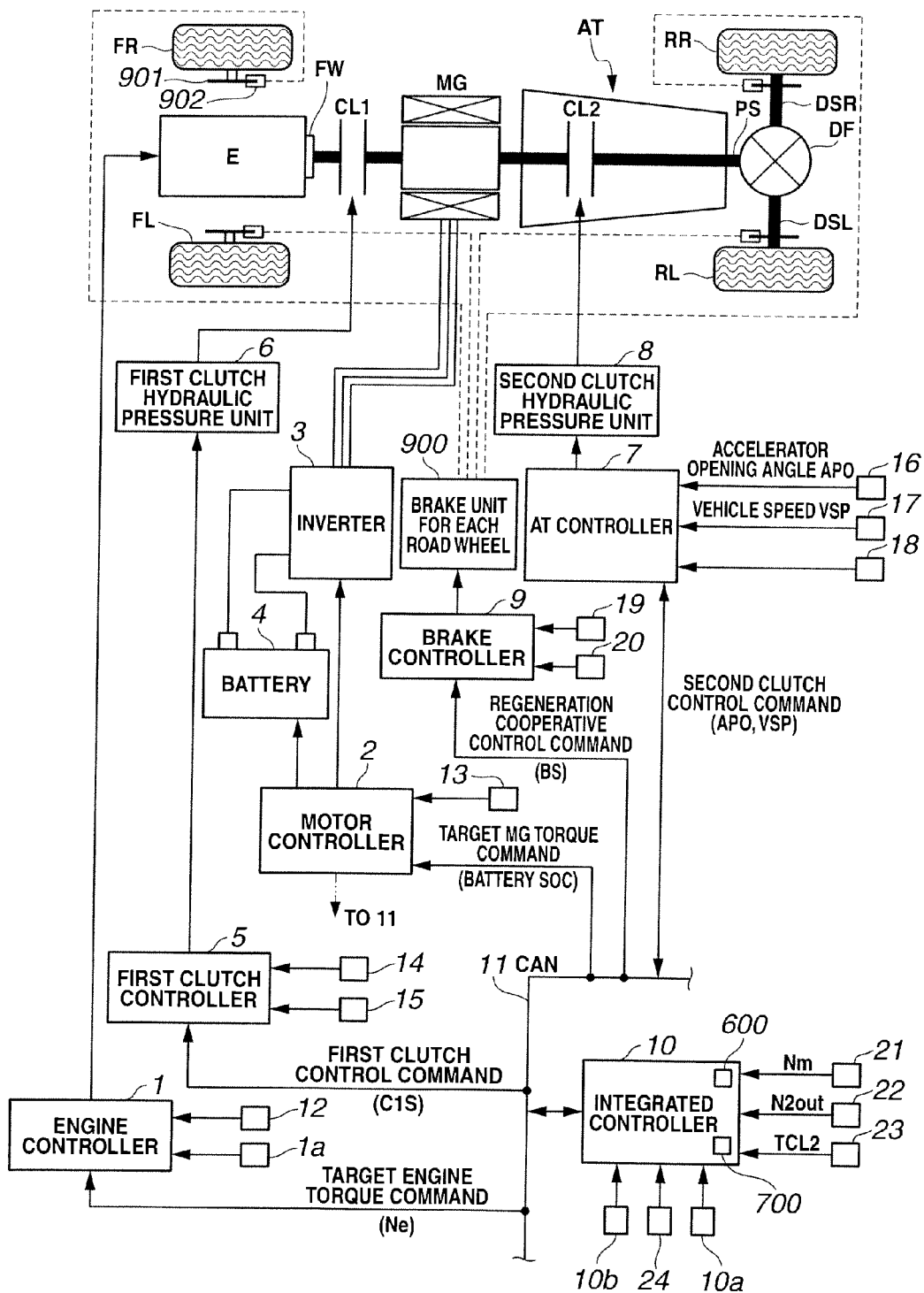
FIG. 1 is a general system configuration view representing a rear wheel drive hybrid vehicle in a preferred embodiment according to the present invention.

First, a structure of a drive train of a hybrid vehicle will be described below. FIG. 1 shows a whole system configuration view representing a rear wheel drive (so called, front engine rear wheel drive (FR)) hybrid vehicle to which a control apparatus in a preferred embodiment according to the present invention is applicable.

The drive train of the hybrid vehicle, as shown in FIG. 1, includes: an engine E; a first clutch CL1; a motor/generator MG; an automatic transmission AT; a propeller shaft PS; a differential DF; a left drive shaft DSL; a right drive shaft DSR; a left rear road wheel RL (driving wheel); and a right rear road wheel RR (driving wheel). It should be noted that FL in FIG. 1 denotes a left front road wheel and FR in FIG. 1 denotes a right front road wheel.

Engine E is, for example, a gasoline engine and a valve opening angle of a throttle valve of engine E is controlled on a basis of a control command issued from an engine controller 1 as will be described later. It should be noted that a flywheel FW is installed on an output shaft of engine E.

First clutch CL1 is a clutch intervened between engine E and motor/generator MG whose engagement and release including a slip engagement are controlled in response to a control hydraulic pressure produced by means of a first clutch hydraulic pressure unit 6 on a basis of a control command issued from a first clutch controller 5 as will be described later.

Motor/generator MG is a synchronous type motor/generator having a rotor in which a permanent magnet is buried and a stator coil wound around a stator thereof. Motor/generator MG is controlled by an application of a three-phase alternating current produced by means of an inverter 3 on a basis of the control command from a motor controller 2 as will be described later. This motor/generator MG is operated as an electric motor which is rotationally driven upon receipt of an electric power from a battery 4 (hereinafter, referred to as an acceleration). This motor/generator MG can generate an electromotive force on both ends of the stator coil as a generator to charge battery 4 (hereinafter, this operating state is called a regeneration), in a case where its rotor is revolved according to an external force. It should be noted that the rotor of this motor/generator MG is linked with an input shaft of automatic transmission AT via a damper (not shown).

Second clutch CL2 is a clutch intervened between motor/generator MG and left and right rear road wheels RL, RR and whose engagement and release including the slip engagement are controlled in response to the control hydraulic pressure produced by means of second clutch hydraulic pressure unit 8 on a basis of the control command from an AT controller 7 as will be described later.

Automatic transmission AT is a transmission which automatically switches a shift ratio of a limited stage such as a forward fifth-speed and reverse first-speed in accordance with a vehicle speed, an accelerator opening angle, and so forth. Second clutch CL2 is not newly added as an exclusive use clutch but corresponds to several frictional engagement elements from among a plurality of frictional engagement elements engaged at respective gear speed stages of automatic transmission AT. It should be noted that the details thereof will be described later.

An output shaft of automatic transmission AT is linked to left and right rear road wheels RL, RR via a propeller shaft PS, a differential gear DF, a left drive shaft DSL, a right drive shaft DSR. It should be noted that a wet type multiple plate clutch which can continuously control an oil flow quantity or hydraulic pressure by means of a proportional solenoid.

A brake unit 900 is provided with a liquid pressure pump and a plurality of electromagnetic valves. A liquid pressure corresponding to a demanded braking torque is secured according to a pressure increase of the pump and a wheel cylinder pressure for each road wheel is controlled according to an open-and-closure control of the electromagnet valve of each road wheel so that a, so-called, brake by wire control is enabled.

A brake rotor 901 and a caliper 902 are disposed on each road wheel of RL, RR, FL, FR to generate a frictional braking torque according to the brake liquid pressure supplied from brake unit 900. It should be noted that an accumulator equipped liquid pressure source may alternatively be used and an electrically driven caliper may alternatively be used in place of a liquid pressure brake.

This hybrid drive train is provided with three traveling modes in accordance with the engagement state or the released state of first clutch CL1. A first traveling mode is an electric vehicle traveling mode (hereinafter, abbreviated as an EV traveling mode) as a motor use traveling mode in which, in the released state of first clutch CL1, the vehicle is traveling with only a power of motor/generator MG as a power source. A second traveling mode is an engine use traveling mode in which, in an engaged state of first clutch CL1, the vehicle is traveling with engine E included in the power source (hereinafter, abbreviated as an HEV traveling mode). A third traveling mode is an engine use slip traveling mode in which, in the engaged state of first clutch CL1, second clutch CL2 is slip controlled and the vehicle is traveling with engine E included in the power source (hereinafter, abbreviated as a WSC (Wet Start Clutch) traveling mode). This mode is a mode in which a creep run is achievable particularly when a battery SOC (State Of Charge) is low or an engine coolant temperature is low. It should be noted that, when the mode is transferred from EV traveling mode to HEV traveling mode, first clutch CL1 is engaged and an engine start is carried out using a torque of motor/generator MG.

The above-described HEV traveling mode includes three traveling modes of "engine traveling mode", "motor assistance traveling mode", and "traveling power generation mode".

In the "engine traveling mode", the driving wheels are moved with only engine E as the power source. In the "motor assistance traveling mode", the driving wheels are moved with two of engine E and motor/generator MG as the power source. In the "traveling power generation mode", driving wheels RR, RL are moved with engine E as the power source and simultaneously with motor/generator MG functioned as the generator.

During a cruise driving (constant speed run) or during an acceleration driving, motor/generator MG is operated as the generator utilizing the power of engine E. In addition, during a deceleration driving, a braking energy is regenerated to generate the power through motor/generator MG and is used to charge battery 4. In addition, as a further traveling mode, a power generation mode in which, during a stop of the vehicle, the power of engine E is utilized to operate motor/generator MG as the generator is prepared.

Next, a control system of the hybrid vehicle will be described below. The control system of the hybrid vehicle in the preferred embodiment according to the present invention, as shown in FIG. 1, includes: an engine controller 1; a motor controller 2; an inverter 3; a battery 4; a first clutch controller 5; a first clutch hydraulic pressure unit 6; an AT controller 7; a second hydraulic pressure unit 8; a brake controller 9; and an integrated controller 10. It should be noted that engine controller 1, motor controller 2, first clutch controller 5, AT controller 7, brake controller 9, and integrated controller 10 are connected via a CAN (Control Area Network) communication line through which a mutual information exchange can be performed.

Engine controller 1 inputs an engine (revolution) speed information from an engine speed sensor 12 and outputs a command to control an engine operating point (Ne: engine speed, Te: engine torque) to, for example, a throttle valve actuator (not shown) in response to a target engine torque command and so forth from integrated controller 10. The further details of engine control contents will be described later. It should be noted that the information on engine speed Ne or so forth is supplied to integrated controller 10 via CAN communication line 11.

Motor controller 2 inputs an information from a resolver 13 for detecting a rotor rotational position of motor/generator MG and outputs a command to control a motor operating point (Nm: motor/generator revolution speed, Tm: motor/generator torque) of motor/generator MG to inverter 3, in response to a target motor/generator torque command and so forth from integrated controller 10. It should be noted that the information such as engine speed Ne and so forth is supplied to integrated controller 10 via CAN communication line 11.

First clutch controller 5 inputs a sensor information from a first clutch hydraulic pressure sensor 14 and a first clutch stroke sensor 15 and outputs a command to control an engagement/release of first clutch CL1 in response to a first clutch control command from integrated controller 10. It should be noted that the information on first clutch stroke C1S is supplied to integrated controller 10 via CAN communication line 11.

AT controller 7 inputs sensor information from an accelerator opening angle sensor 16, a vehicle speed sensor 17, a second clutch hydraulic pressure sensor 18, and an inhibitor switch which outputs a signal in accordance with a position of a shift lever that the vehicle driver operates and outputs a command to engage or release second clutch CL2 in response to a second clutch control command from integrated controller 10 to second clutch hydraulic pressure unit 8 within an AT hydraulic pressure control valve. It should be noted that the information on accelerator pedal opening angle APO, vehicle speed VSP, and the inhibitor switch is supplied to integrated controller 10 via CAN communication line 11.

Brake controller 9 inputs the sensor information from road wheel speed sensors 19 for detecting road wheel speeds of respective four road wheels and performs a regeneration cooperative brake control on a basis of a regeneration cooperative control command from integrated controller 10 in such a way that, for example, during a brake depression braking, only the regenerative braking torque is insufficient for the driver demanded braking torque derived from brake stroke BS, the insufficient torque is compensated by the mechanical braking toque (braking torque according to a frictional brake). It is of course that the brake liquid pressure can arbitrarily be generated in response to another control demand, not only the brake liquid pressure in accordance with the driver demanded braking torque.

Integrated controller 10 administrates a consumed energy of the whole vehicle and plays a function to travel the vehicle at a maximum efficiency. Integrated controller 10 inputs information from motor revolution speed sensor 21 for detecting motor revolution speed Nm, a second clutch output revolution speed sensor 23 for detecting a second clutch output revolution speed N2out, a second clutch torque sensor 23 for detecting a second clutch transmission torque capacity TCL2, a brake hydraulic pressure sensor 24, a temperature sensor 10a for detecting a temperature (a working oil temperature) of second clutch CL2, and a G sensor 10b for detecting a longitudinal acceleration of the vehicle and information obtained via CAN communication line 11.

In addition, integrated controller 10 performs am operation control of engine E through the control command to engine controller 1, an operation control for motor/generator MG through the control command to motor controller 2, engagement and release control of first clutch CL1 through the control command to first clutch controller 5, and engagement and release control to first clutch CL2 in response to the control command to AT controller 7.

Integrated controller 10 includes: a gradient load torque corresponding value calculating section 600 for calculating a gradient load torque corresponding value acted on each of the road wheels on a basis of a road surface gradient estimated as will be described later; and a second clutch protection control section 700 for generating the brake liquid pressure in spite of a brake pedal manipulated variable of the driver when a predetermined condition is established.

The gradient load torque corresponding value is a value corresponding to a load torque acted upon each of the road wheels when a gravity acted upon the vehicle due to the presence of the road surface gradient reverses the vehicle. The brake which generates the mechanical braking torque on each of the road wheels generates the braking torque by pressing a brake pad onto brake rotor 901 through caliper 902. Hence, when the vehicle is to move backward due to the gravity of the vehicle, a direction of the braking torque is coincident with a vehicular forward direction. This braking torque which coincides with the vehicular forward direction is defined as a gradient load torque.

This gradient load torque can be determined according to the road surface gradient and a vehicular inertia. Hence, the gradient load torque corresponding value is calculated on a basis of a vehicular weight and so forth preset in integrated controller 10. It should be noted that the gradient load torque may directly be used as the corresponding value or may be the corresponding value after addition or subtraction by a predetermined value.

Second clutch protection control section 700 calculates a braking torque minimum value (the braking torque equal to or larger than the gradient load torque as described hereinbefore) which can avoid, so-called, a rollback in which the vehicle moves backward when the vehicle is stopped on a gradient road and outputs the braking torque minimum value as a control lower limit value to brake controller 9 when a predetermined condition (during the vehicle stop, the road surface gradient being equal to or larger than a predetermined value) is established.

In this embodiment, the brake liquid pressure is acted upon the rear road wheels which are the driving wheels.

However, the brake liquid pressures may be supplied for four road wheels with distributions on front and rear road wheels or so forth taken into consideration. Or alternatively, the brake liquid pressures may be supplied only for front road wheels.

On the other hand, if the predetermined condition is not established, the command to gradually reduce the braking torque is outputted from second clutch protection control section 700. In addition, if the predetermined condition is established, second clutch protection control section 700 outputs the command to request to inhibit a transmission torque capacity control output to second clutch CL2.

Figure 2:
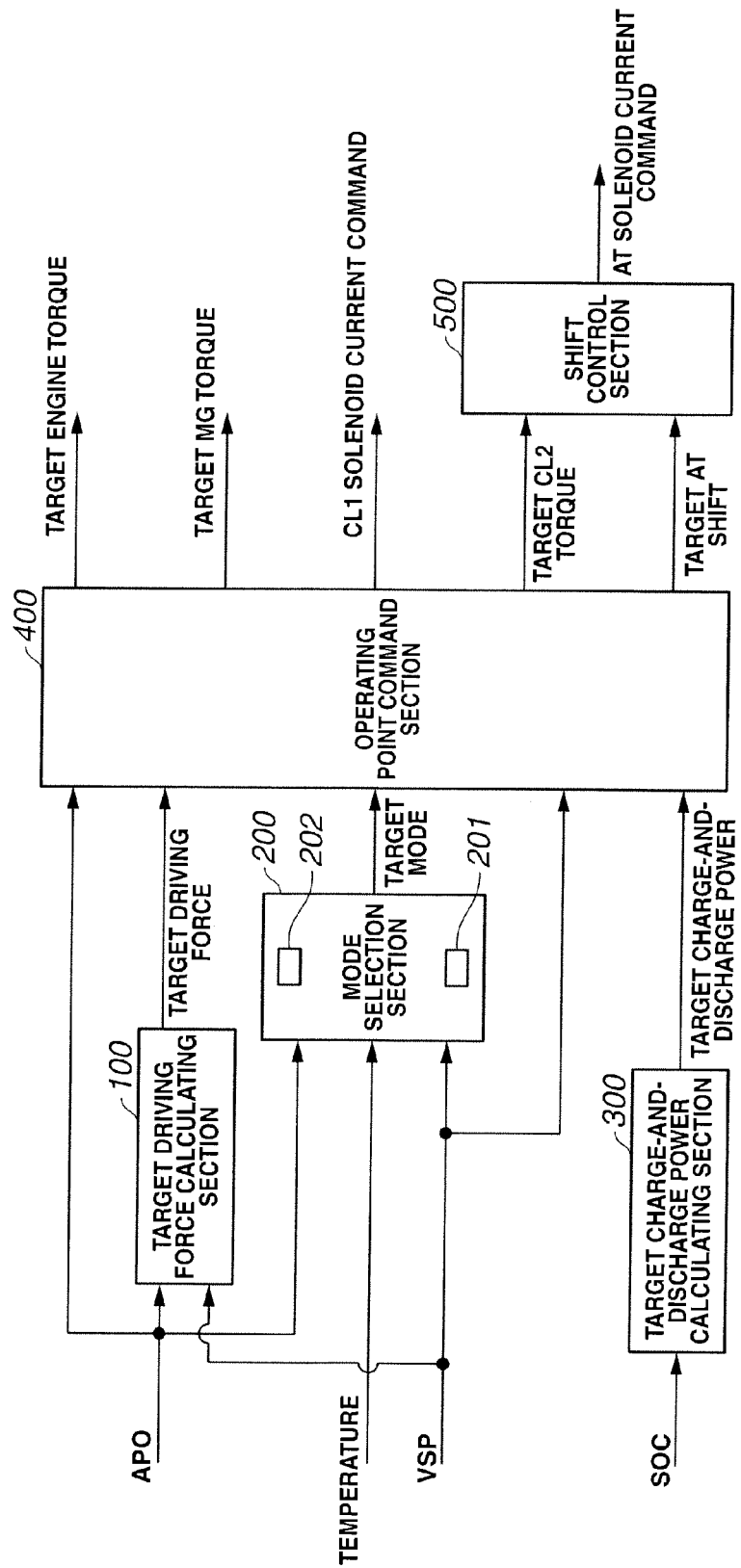
FIG. 2 is a control block diagram representing a calculation processing program in an integrated controller in the preferred embodiment shown in FIG. 1.

Hereinafter, the control of calculation carried out in integrated controller 10 in this embodiment will be described using a block diagram of FIG. 2. For example, this calculation is carried out by integrated controller 10 in this embodiment for each control period of 10 milliseconds. Integrated controller 10 includes: a target driving force calculating section 100; a mode selection section 200; a target charge-and-discharge calculating section 300; an operating point command section 400; and a shift control section 500.

Figure 3:
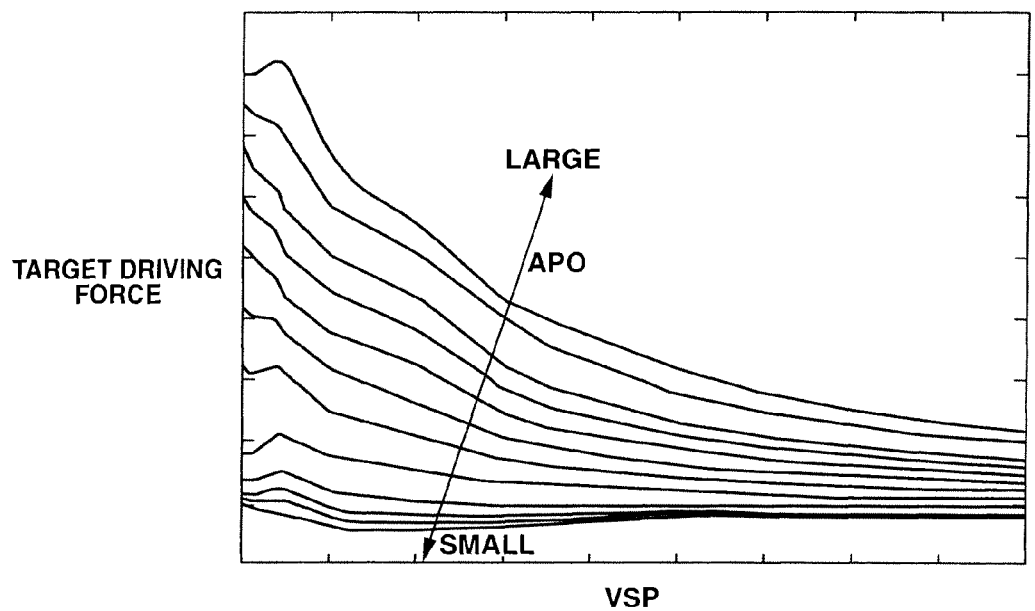
FIG. 3 is a map view representing one example of a target driving force map used in a target driving force calculation in a target driving force calculating section shown in FIG. 2.

Target driving force calculating section 100 calculates a target driving force tFoO (driver demanded torque) from accelerator pedal opening angle APO and vehicle speed VSP using a target driving force map shown in FIG. 3.

Mode selection section 200 is provided with a road surface gradient estimation calculating section 201 which estimates the road surface gradient on a basis of the detected value of G sensor 10b. Road surface gradient estimation calculating section 201 calculates an actual acceleration from an average value of road wheel accelerations derived from road wheel speed sensor 19 and estimates the road surface gradient from a deviation between a result of the calculated actual acceleration and a detected value of G sensor 10b.

Figure 4:
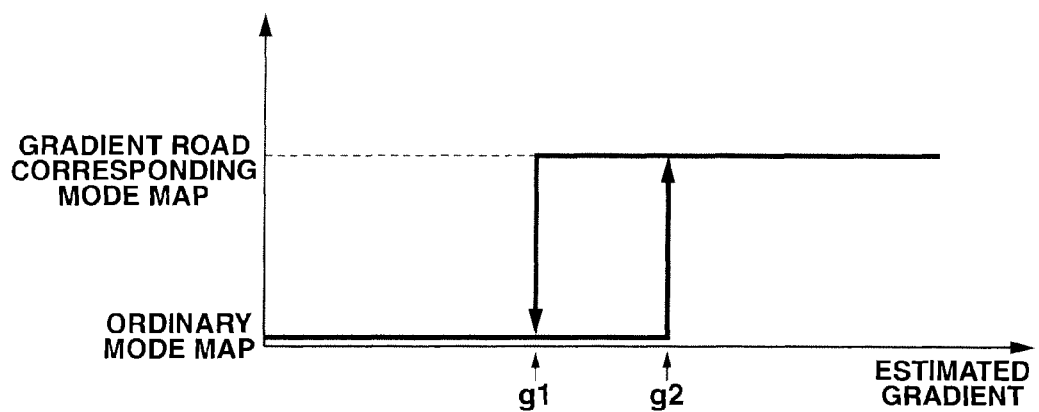
FIG. 4 is a graph representing a relationship between a mode map and an estimated gradient in a mode selection section in FIG. 2.

Furthermore, mode selection section 200 is provided with a mode map selection section 202 which selects either one of two mode maps as will be described later. FIG. 4 is a rough view representing a selection logic of mode map selection section 202. Mode map selection section 202 switches the presently selected ordinary mode map to a gradient road corresponding mode map when the estimated road gradient is transferred to a state equal to or larger than a predetermined value g2 from the state in which the ordinary mode map is selected. On the other hand, if the estimated road gradient is smaller than a predetermined value g1 (<g2) from the state in which the road gradient corresponding mode map is selected, mode selection section 202 switches the presently select mode map to the ordinary mode map. That is to say, a hysterisis is provided for the estimated road gradient so that a control hunting during a map switching is prevented.

Figure 5:
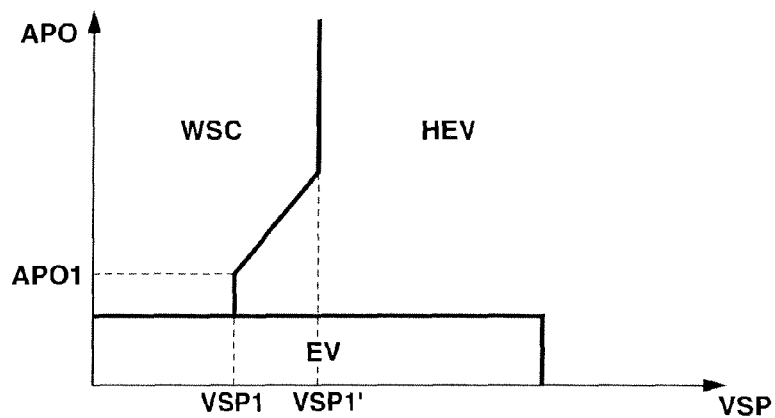
FIG. 5 is a graph representing an ordinary mode map used in a selection of a target mode in the mode selection section shown in FIG. 2.
Figure 6:
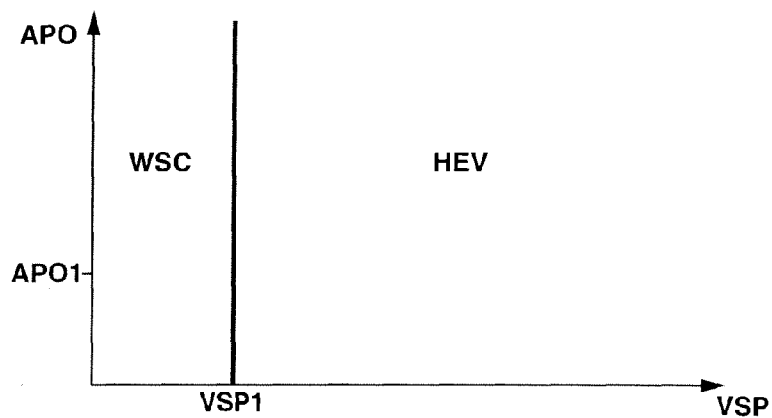
FIG. 6 is a graph representing a MWSC corresponding mode map used in the selection of a target mode in the mode selection section in FIG. 2.

Next, the mode maps will be described below. The mode maps include: the ordinary mode map which is selected when the estimated road gradient is smaller than the predetermined value; the road gradient corresponding mode map selected when the estimated road gradient is equal to or larger than the predetermined value. FIG. 5 shows the ordinary mode map and FIG. 6 shows the road gradient corresponding mode map.

The ordinary mode map includes: the EV traveling mode; the WSC traveling mode; the HEV traveling mode; and calculates the target mode from accelerator pedal opening angle APO and vehicle speed VSP. It should be noted that, even if battery SOC is equal to or lower than the predetermined value, mode selection section 202 forcefully sets the HEV traveling mode or the WSC traveling mode as the target mode.

In the ordinary mode map in FIG. 5, a switching line of HEV→WSC is set in a region lower than a lower limit vehicle speed VSP1 which is smaller than an idling speed of engine E when automatic transmission AT is at a first-speed stage, in a region in which accelerator pedal opening angle APO is smaller than a predetermined accelerator opening angle APO1.

In addition, in a region in which accelerator pedal opening angle APO is equal to or larger than predetermined accelerator opening angle value APO1, a large driving force is demanded. Hence, the WSC traveling mode is set up to a vehicle speed region VSP1' which is higher than lower limit vehicle speed VSP1. It should be noted that, if battery SOC is so low that cannot achieve the EV traveling mode, the WSC traveling mode is selected even if the state is such that the vehicle is started.

When accelerator pedal opening angle APO is large, it is often difficult to achieve the driver demanded torque by the engine torque and the motor generator torque corresponding to the engine speed placed in the vicinity to the idling speed.

It should, herein, be noted that the engine torque can output the larger torque if the engine revolution speed is more increased.

Thus, even if the WSC traveling mode is executed to a higher vehicle speed than lower limit value VSP1 if the engine speed is raised to output the larger torque, the mode selection 202 can transit the traveling mode from the WSC traveling mode to the HEV traveling mode in a short period of time. In this case, WSC region provides a wide region up to another lower limit vehicle speed VSP1'.

The EV traveling mode is not set in road gradient corresponding mode map as shown in FIG. 6 and this is a different point from the ordinary mode map shown in FIG. 5. In addition, a region change of the WSC traveling mode region and the HEV traveling mode is not dependent upon accelerator pedal opening angle APO and these regions are prescribed only by lower limit vehicle speed VSP1, these being different from the ordinary mode map.

Figure 7:
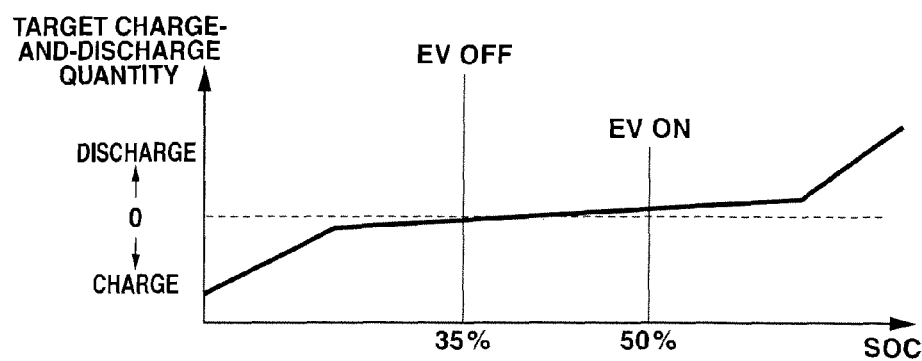
FIG. 7 is a graph representing one example of a target charge-and-discharge quantity map used for the calculation of a target charge-and-discharge power in a target charge-discharge power calculating section in FIG. 2.

Target charge-and-discharge calculation section 300 calculates a target charge-and-discharge electric power tP from battery SOC using a target charge-and-discharge quantity map shown in FIG. 7. In the charge-and-discharge quantity map, an EV ON line (MWSC ON line) and an EV OFF line (MWSC OFF line) is set to allow or inhibit the EV traveling mode at a position of SOC=50% and at a position of SOC=35%. When SOC≥50%, an EV traveling mode region appears in the ordinary mode map in FIG. 5. Once the EV region appears within the mode map, this region of EV traveling mode region is continued to appear until SOC is reduced and in excess of 35%.

When SOC<35%, the EV mode region is continued to be extinguished in the ordinary mode map in FIG. 5. If the EV traveling mode region is extinguished from the mode map, this region is continued to be extinguished until SOC is reduced and in excess of 35%.

Operating point command section 400 calculates a transient target engine torque, a target motor/generator torque, a target motor/generator torque, a target second clutch transmission torque capacity TCL2*, a target shift ratio of automatic transmission AT, and a first clutch solenoid current command as these operating point achieving targets from accelerator pedal opening angle APO, to target driving force tFoO (driver demanded torque), the target mode, vehicle speed VSP, and target charge-and-discharge power tP. In addition, operating point command section 400 is provided with an engine start control section configured to start engine E when the traveling mode is is transferred from the EV traveling mode to the HEV traveling mode.

Shift control section 500 drivingly controls the solenoid valve within automatic transmission AT to achieve target second clutch transmission torque capacity TCL2* and the target shift stage. It should be noted that, in the shift map, each of target shift stages is present on a basis of vehicle speed VSP and accelerator opening angle APO.

[Wsc Traveling Mode]

Next, the details of the WSC traveling mode will be descried below.

The WSC traveling mode has a feature such that engine E is maintained in the operating state. A responsive characteristic to a variation in the driver demanded torque is high. Specifically, first clutch CL1 is completely engaged, second clutch CL2 is slip controlled, second clutch CL2 having transmission torque capacity TCL2 which accords with the driver demanded torque, and the vehicle is traveling using the driving force of either or both of engine E and motor/generator MG.

In the hybrid vehicle in this embodiment, an element which absorbs a revolution speed difference such as a torque converter is not present so that, if first clutch CL1 and second clutch CL2 are completely engaged, the vehicle speed is determined in accordance with the engine speed of engine E. A lower limit value according to the idling speed to maintain a spontaneous revolution of engine E is present in engine E. If an idle up is repeated by means of a warm-up driving of the engine, the lower limit value becomes accordingly higher. In the region in which the driver demanded torque is high, the traveling mode cannot often quickly be transferred to the HEV traveling mode On the other hand, since, in the EV traveling mode, first clutch CL1 is released, no limitation along with the lower limit value according to the engine speed is placed. However, in a case where the traveling in the EV traveling mode is difficult due to the limitation based on battery SOC or in a region in which only motor/generator MG cannot achieve the driver demanded torque, there is no means except a generation of a stable torque by means of engine E.

Therefore, in a lower vehicle speed region than the vehicle speed corresponding to the lower limit value in which the traveling in the EV traveling mode is difficult or in which the driver demanded torque cannot be achieved by means of only motor/generator MG, the WSC traveling mode is selected in which engine speed is maintained at a predetermined lower limit speed, second clutch CL2 is slip controlled, and the engine torque is used to travel the vehicle.

Figure 8A:
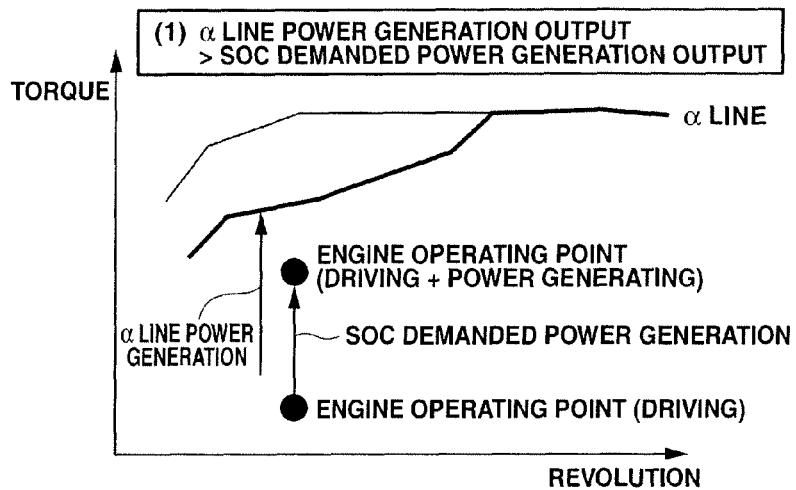
FIGS. 8A, 8B, and 8C are rough explanatory views representing engine operating point processes in a WSC traveling mode.
Figure 8B:
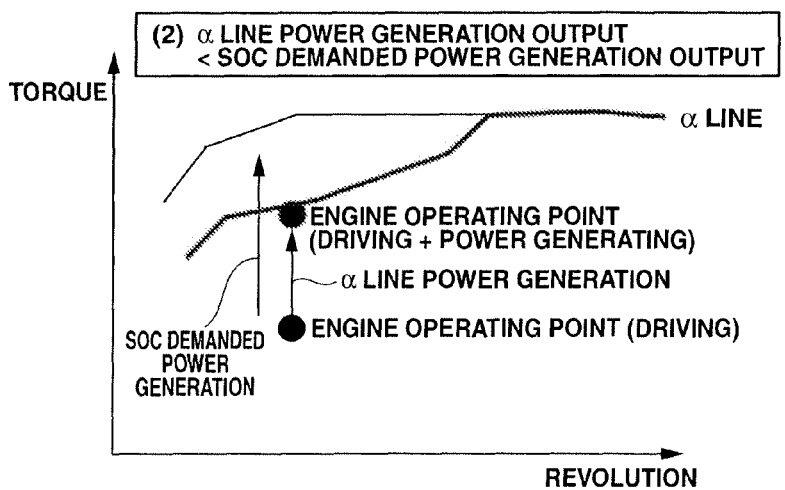
Figure 8C:
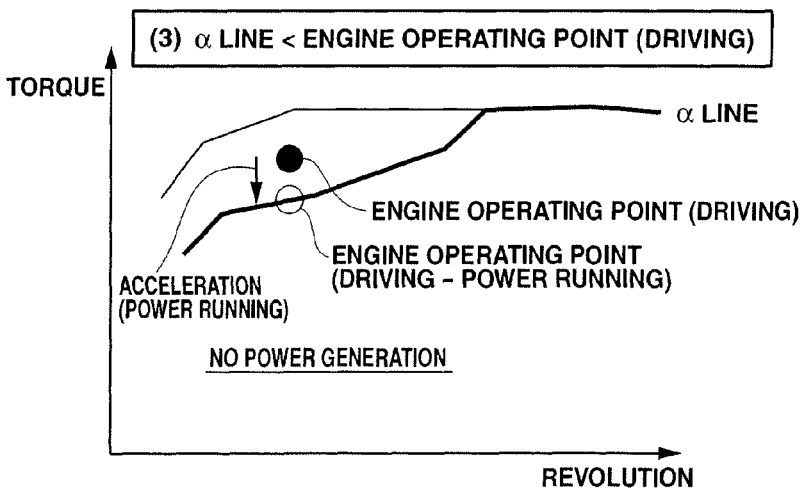
Figure 9:
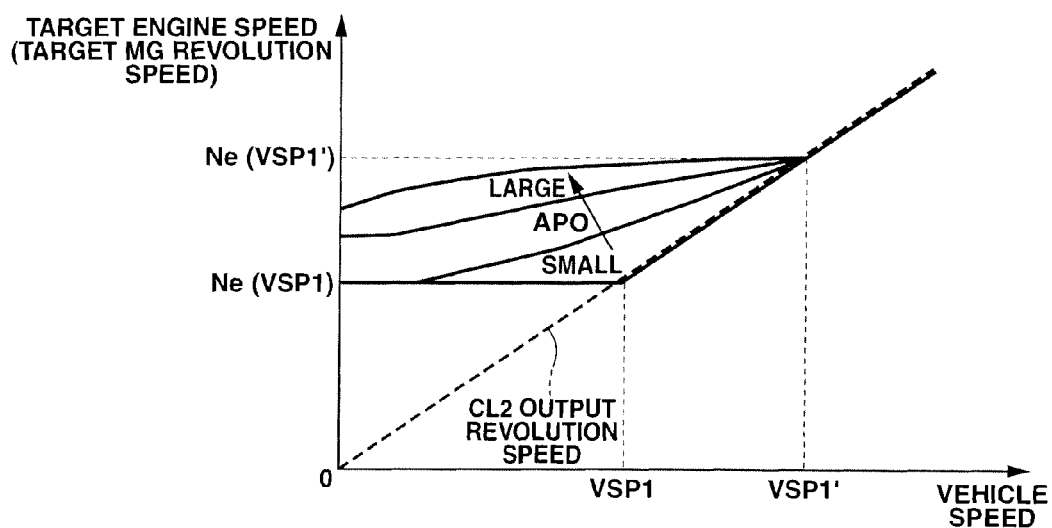
FIG. 9 is a map view representing an engine target speed in the WSC traveling mode.

FIGS. 8A, 8B, and 8C are rough views representing an engine operating point setting process in the WSC traveling mode. FIG. 9 shows a map representing an engine target speed in the WSC traveling mode. When, in the WSC traveling mode, the driver depresses the accelerator pedal so as to select a target engine speed characteristic in accordance with accelerator pedal opening angle APO on a basis of FIG. 9 and the target engine speed is set in accordance with the vehicle speed along with the selected characteristic. The target engine torque corresponding to the target engine speed is, then, calculated through the engine operating point setting process shown in FIGS. 8A through 8C.

It should, herein, be noted that the operating point of engine E is defined as a point prescribed by an engine speed and engine torque. As shown in FIGS. 8A through 8C, the engine operating point is desirably driven to on a line connecting operating points at each of which an output efficiency of engine E is high (hereinafter, called an α line).

However, in a case where the engine speed is set as described above, an operating point which is separated from α line according to the accelerator pedal manipulated variable of the driver (accelerator pedal opening angle APO) (the driver demanded torque) is selected. It should herein be noted that, in order to make the engine operating point approach to α line, the target engine torque is feed-forward controlled to a value, with α line considered.

On the other hand, in motor/generator MG, a revolution speed feedback control (hereinafter, referred to as a revolution speed control) in which the set engine speed is a target revolution speed of motor/generator MG is executed. Since engine E is, at this time, directly coupled with motor/generator MG, motor/generator MG is controlled to maintain the target revolution speed. Thus, the revolution speed of engine E is also automatically feedback controlled (hereinafter, referred to as a motor ISC (Idle Speed Control) control).

At this time, the torque which is outputted by motor/generator MG is automatically controlled so as to offset the deviation between the target engine torque determined with α line taken into consideration and the driver demanded torque. Basic torque controlled variables (regeneration and power running (acceleration)) are given in order to offset the above-described deviation and the feedback control is performed to coincide the revolution speed of motor/generator MG with the target engine speed.

In a case where the driver demanded torque is smaller than the driving force on α line at a certain engine speed, the engine output efficiency is raised when the engine output torque is increased. At this time, if the energy according to the increase of the engine output torque is collected by means of motor/generator MG, the power generation having the high efficiency becomes possible while the torque itself inputted to second clutch CL2 is the driver demanded torque. It should, however, be noted that, since a torque upper limit value by which the power generation is possible is determined according to the state of battery SOC, it is necessary to consider a magnitude relationship between a demanded power generation output from the battery SOC (SOC demanded power generation) and the deviation (α line generated power) between the torque at the present operating point and the torque on α line.

FIG. 8A shows a rough view of characteristic representing engine operating point setting process in a case where α line generated power (α line power generation output) is larger than SOC demanded generated power (SOC demanded power generation output). Since the engine output torque cannot be raised exceeding SOC demanded power generation output, the engine operating point cannot be moved on α line. It should, however, be noted that a fuel consumption efficiency is improved by moving the engine operating point to a point at which the engine output efficiency is higher.

FIG. 8B shows the rough view of characteristic representing the engine operating point setting process in a case where α line power generation output (generated power) is smaller than SOC demanded power generation output (SOC demanded generated power). Since the engine operating point can be moved on α line if α line power generation output is within SOC demanded power generation output, the power generation can be carried out while maintaining the operating point at which the fuel consumption efficiency is highest.

FIG. 8C shows the rough view of characteristic representing the engine operating point setting process in a case where the engine operating point is higher than α line. When the engine operating point in accordance with the driver demanded torque is higher than α line, the engine torque is reduced and its insufficient quantity of the engine torque is compensated for with the power running (acceleration) of motor/generator MG. Thus, the driver demanded torque can be achieved while a fuel consumption efficiency is made high.

Next, a case where the WSC traveling mode is modified in accordance with an estimated (road) gradient will be described below.

Figure 10:
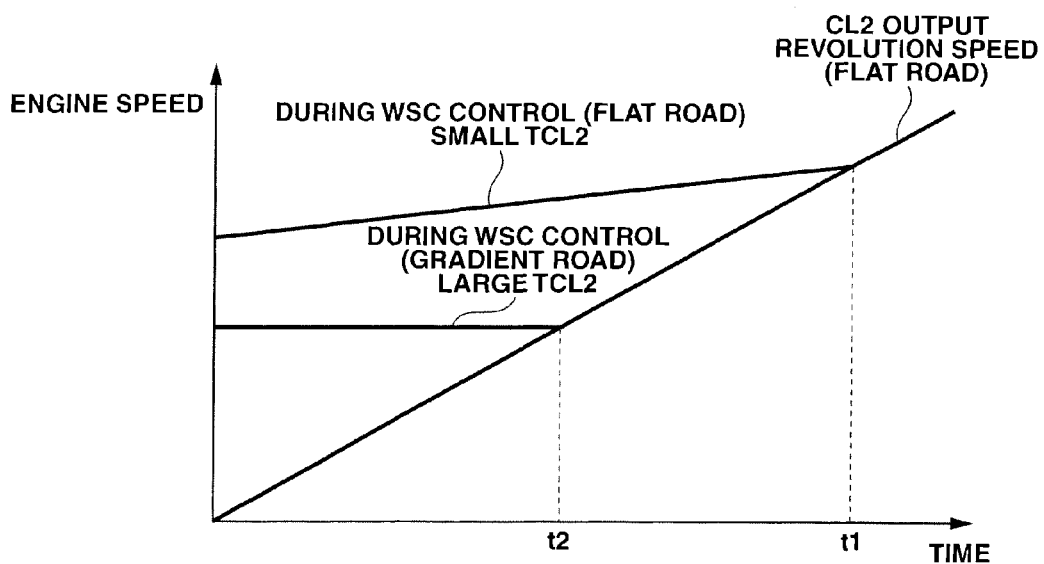
FIG. 10 is a timing chart representing a variation in an engine speed when a vehicle speed is raised in a predetermined state.

FIG. 10 shows an engine speed map when the vehicle speed is raised in a predetermined state. In a case where accelerator pedal opening angle APO is larger than a predetermined value of APO1 when the vehicle is traveling on a flat road, a WSC traveling mode region is executed up to a vehicle speed region higher than lower limit vehicle speed VSP1 (as shown in FIG. 5). At this time, a target engine speed is gradually raised along with the increase in the vehicle speed as shown in the map of FIG. 9. Then, when the vehicle speed is reached to a vehicle speed corresponding to VSP1', the slip state of second clutch CL2 is eliminated and the traveling mode is transferred to the HEV traveling mode (refer to FIG. 5).

When the vehicle is traveling on a road having a larger estimated gradient than a predetermined gradient (g1 or g2), a correspondingly large acceleration pedal opening angle is needed to maintain the same vehicle speed increase state as described above. At this time, a transmission torque capacity TCL2 of second clutch CL2 becomes large as compared with the case where the vehicle travels on the flat road. In this state, if the WSC traveling mode region is expanded as shown by the map of FIG. 9, the slip state is continued with a strong engagement force in second clutch CL2. Thus, there is a possibility of occurrence of excessive heat generation in second clutch CL2. Therefore, in the gradient road corresponding mode map in FIG. 6 selected when the vehicle is traveling on the to gradient road having the large estimated gradient, the WSC traveling mode region is not unnecessarily widened and is only extended to a region corresponding to the predetermined vehicle speed of VSP1. Consequently, the excessive heat generation of second clutch CL2 in the WSC traveling mode is avoided.

It should be noted that, in a case where the revolution speed control by means of motor/generator MG is difficult, for example, in a case where the limitation according to the battery SOC is placed or in a case where a controllability of motor/generator MG cannot be secured due to an extremely low temperature environment, the engine ISC control in which engine E performs the revolution speed control is carried out.

[MWSC Traveling Mode]

Next, the reason of setting an MWSC traveling mode region will be described below.

When the estimated gradient is larger than the predetermined gradient (g1 or g2), for example, when the vehicle is maintained at the vehicle stopped state or is maintained at a vehicle start state at a minute vehicle speed, the large driving force is required as compared with the case of the vehicular run on the flat road. This is because it is necessary to oppose against a weight load on the vehicle. From the viewpoint of avoiding the heat generation due to the slip of second clutch CL2, it is thought that the EV traveling mode is selected if a margin power is left in battery 4 from the viewpoint of battery SOC. At this time, it is necessary to carry out the engine start when the traveling mode region is transferred from the EV traveling mode region to the WSC traveling mode region. Since motor/generator MG outputs the driving torque in a state in which an engine start torque is secured, an upper limit value of the driving torque is unnecessarily lowered. In addition, if only the torque is outputted from motor/generator MG in the EV traveling mode and the revolution of motor/generator MG is stopped or is revolved at an extremely low revolution speed, a lock current is caused to flow through one of switching elements of inverter 3 (a phenomenon that a current is continued to flow through a single switching element) and there is a possibility of an introduction of reduction in a durability. In addition, in a region (a region equal to or lower than VSP2) lower than lower limit vehicle speed VSP1 corresponding to the idling speed of engine E at the first speed (1st speed), engine E itself cannot reduce the engine speed to be lower than the idling speed. At this time, if the WSC traveling mode is selected, the slip quantity of second clutch CL2 becomes large and there is a possibility of giving an influence on the durability of second clutch CL2.

Especially, the large driving force is required when the vehicle travels on the gradient road (a road having a high gradient) as compared with the vehicular travel on the flat road. Hence, the transmission torque capacity required for second clutch CL2 becomes high and it is easy to introduce the reduction in durability in second clutch CL2 due to the continuation of high slip state with high torque in second clutch CL2.

In addition, the rise in the vehicle speed becomes slow so that it takes a lot of time for the traveling mode to be transferred to the HEV traveling mode. Consequently, there is a possibility of the further heat generation of second clutch CL2.

Therefore, an MWSC traveling mode is set as follows: With engine E operated, first clutch CL1 is released and the transmission torque capacity of second clutch CL2 is controlled to the demanded driving force that the driver has demanded. At the same time, the revolution speed of motor/generator MG is feedback controlled to reach to a target revolution speed which is higher than the output revolution speed of second clutch CL2 by a predetermined revolution speed.

In other words, the slip control of second clutch CL2 is performed while the revolution speed of motor/generator MG is lower than the idling speed of engine E. At the same time, the control for engine E is switched into the feedback control in which the idling speed is set to the target revolution speed of engine E. In the WSC traveling mode, the engine speed is maintained according to the revolution speed feedback control of motor/generator MG. On the other hand, if first clutch CL1 is released, the engine speed cannot be controlled to the idling speed by means of motor/generator MG. Hence, an engine self-contained (spontaneous) revolution control according to engine E itself is performed.

The following advantages can be obtained through the setting of MWSC traveling mode.

1) Since engine E is in the operating state, it is not necessary to leave the driving torque corresponding to the engine start in motor/generator MG so that the driving torque upper limit value of motor/generator MG can be increased. Specifically, as viewed from the demanded driving force axis, the driving torque of motor/generator MG can correspond to demanded driving force higher than the region of the EV traveling mode.

2) The durability of the switching elements and so forth can be improved by securing the revolution state (speed) of motor/generator MG.

3) Since motor/generator MG is revolved at the revolution speed lower than the idling speed, the reduction in a slip quantity of second clutch CL2 becomes possible so that the durability of second clutch CL2 can be improved.

(Task of Vehicle Stopped State in the WSC Traveling Mode)

As described above, in a case where the vehicle driver depresses the brake pedal in a state in which the WSC traveling mode is selected to stop the vehicle, the transmission torque capacity corresponding to a creep torque is set on second clutch CL2 and the revolution speed control to maintain motor/generator MG directly coupled with engine E is executed. Since the revolution speed of each of the driving wheels is zero due to the vehicle stop, the slip quantity corresponding to the idling speed is generated on second clutch CL2. If this state is continued for a long period of time, the durability of second clutch CL2 may be reduced. Hence, in a case where the brake pedal is depressed by the vehicle driver and the vehicle stopped state is maintained, it is desirable to release second clutch CL2.

In this case, the control in which second clutch CL2 is released provides a problem. That is to say, second clutch CL2 is a wet-type multiple-plate clutch and the transmission torque capacity is developed by pressing a plurality of clutch plates by means of a piston. A return spring is installed onto the piston from a viewpoint of a drag torque reduction. If a supply hydraulic pressure to second clutch CL2 is excessively reduced, the piston of second clutch CL2 is returned to an original position by means of the return spring. Thereby, when the piston is separated from the clutch plates, the transmission torque capacity is not developed until the piston is stroked to be contacted on the clutch plates even if the hydraulic pressure is again started to supply. Thus, there is a possibility of introductions of a time lag to the start (a rollback due to the time lag is included) and an engagement shock. In addition, even if the supply hydraulic pressure is previously controlled to make the transmission torque capacity optimum, there is a possibility that the optimum transmission torque capacity cannot be set due to the influence of the oil temperature or due to manufacturing dispersions and so forth.

Therefore, in this embodiment, a vehicle stop time transmission torque capacity corrective control process in which the transmission torque capacity of second clutch CL2 is set to the transmission torque capacity by which the time lag and engagement shock can be avoided is introduced to set an optimum transmission torque capacity at a time of the vehicle stop.

[Vehicle Stop Time Transmission Torque Capacity Corrective Control Process]

Figure 11B:
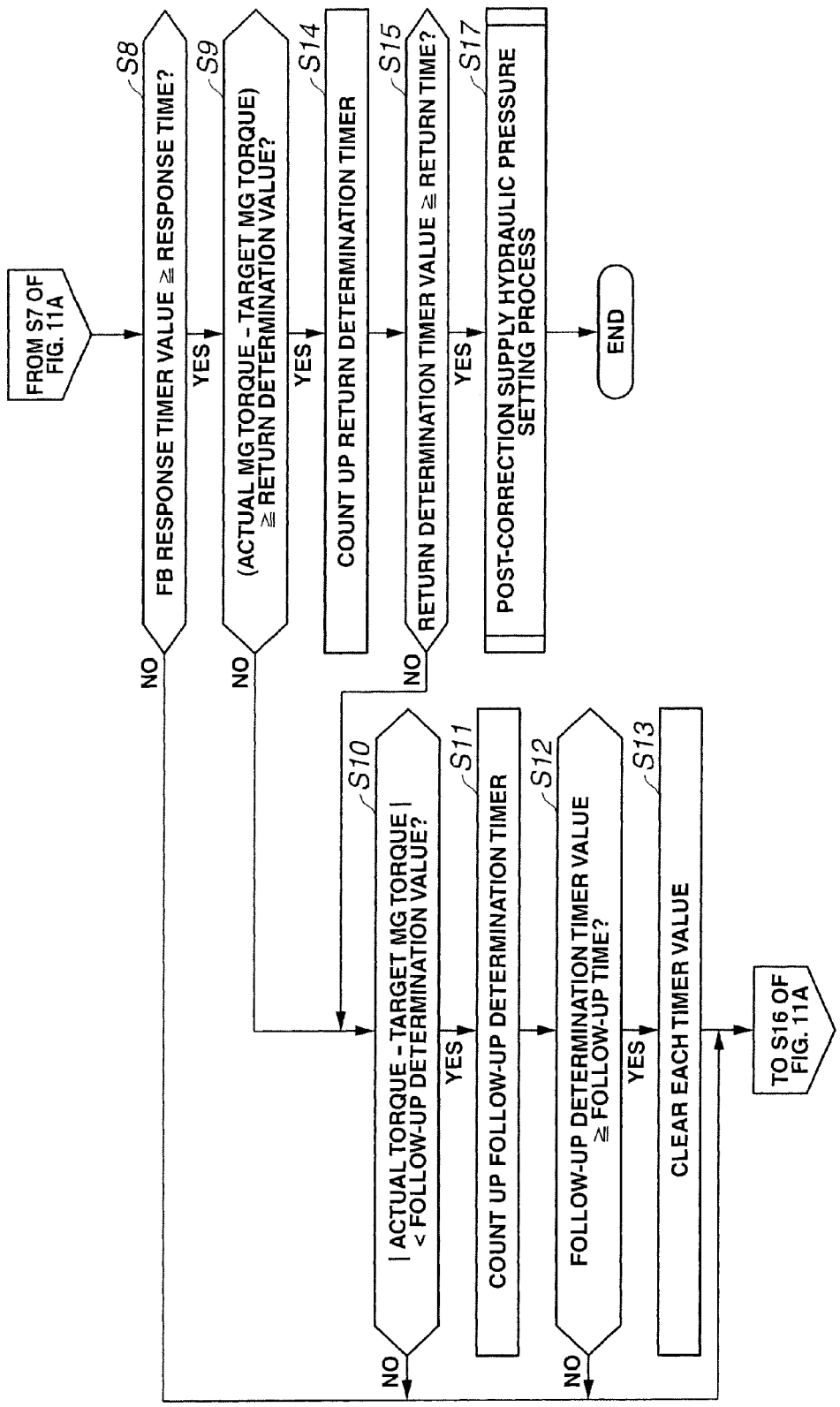

FIGS. 11A and 11B integrally show a flowchart representing the vehicle stop time transmission torque capacity corrective (correction) control process in the embodiment shown in FIG. 1.

At a step S1, integrated controller 10 determines whether a corrective control start condition (correction start condition, namely, a condition to start the vehicle stop time transmission torque capacity corrective control process) is established. If the condition is established (Yes) at step S1, the routine goes to a step S2. If not established (No) at step S1, the control flow of FIGS. 11A and 11B is ended. It should, herein, be noted that the corrective control start condition is that the brake pedal is ON, accelerator pedal opening angle APO is zero, the vehicle speed is zero, during the WSC traveling mode (namely, the revolution speed control for motor/generator MG is carried out and the transmission torque capacity corresponding to the creep torque is set to second clutch CL2), and stop determination flags ON at any other controllers. It should be noted that zero may be a value which can be recognized to be approximately zero as a sensor value.

In addition, in a case where the traveling mode is transferred from the MWSC traveling mode in which engine E itself performs the engine spontaneous (self-contained) revolution control in which an intake air quantity is adjusted to maintain the engine speed at the idling speed to the WSC traveling mode, or in a state in which the control state is transferred from a state of the to engine ISC control in which the revolution speed control by means of engine E is carried out during the WSC traveling mode to the motor ISC control in which the revolution speed control by means of motor/generator MG maintains the idling speed, the correction start is allowed after a is predetermined time has passed from this transition. This is because, in the revolution speed control by means of engine E, the modifications of the ignition timing and the intake air quantity are made and it is necessary to consider the influence by these modifications.

At step S2, integrated controller 10 executes a target MG torque setting process. It should, herein, be noted that target MG torque is not a value used actually in the control of motor/generator MG but is a target value used in this corrective control process. That is to say, since the revolution speed control is carried out for motor/generator MG in motor controller 2, integrated controller 10 outputs a torque command to motor controller 2 to maintain the idling speed. In other words, since the actual torque of motor/generator MG is determined according to the load acted upon motor/generator MG, a torque variation quantity of motor/generator MG can be deemed to be a variation in the transmission torque capacity of second clutch CL2. Therefore, the target MG torque (a value to which the MG torque is supposed to be changed when the load is changed) is set on a basis of the load which can be thought to be changed when the supply hydraulic pressure is modified by the predetermined quantity. Similarly, actual MG torque is a value calculated on a basis of a motor drive current received from motor controller 2 (corresponds to torque detecting means (section)).

A specific setting content of the target MG torque will be described herein. In a case where the MG torque is determined to follow the MG torque to the target MG torque at steps S10 through S 17, the target MG torque is set to a value subtracted in a stepwise manner from the previous target MG torque by a predetermined quantity (this predetermined quantity is, hereinafter, referred to as a stepwise subtraction quantity). Otherwise, the target MG torque maintains the previous target MG torque. This stepwise subtraction quantity is set to a large value as compared with a reduction quantity by means of a ramp control. This is because in this control process, a timer control achieves a steady state (a static state) and various kinds of determinations are made with the above-described matter as a prerequisite; thus, it takes a lot of time to set an optimum correction quantity of the transmission torque capacity if the target MG torque is varied by a slight quantity. In other words, since it is difficult to make the appropriate state determination in a dynamic state and it is necessary to wait after the state is varied to some extent, the large stepwise subtraction quantity is set. The command hydraulic pressure before the subtraction thereof by the stepwise subtraction quantity is an initial command hydraulic pressure.

At a step S3, integrated controller 10 counts up (increments) a feedback (FB) inhibit timer. At a step S4, integrated controller 10 determines whether the feedback inhibit timer value is equal to or larger than a feedback (FB) inhibit time (duration). If Yes at step S4, the routine goes to a step S6. If No at step S4, the routine goes to a step S5. That is to say, during the count up of this timer, a feedback controlled variable is not outputted.

At step S5, integrated controller 10 executes the feedforward control process that the command hydraulic pressure to second clutch CL2 is reduced in the stepwise manner and the routine goes to a step S16.

In other words, even if the deviation between the command hydraulic pressure and the actual hydraulic pressure is present, integrated controller 10 continues to output a constant command value irrespective of this deviation. The actual hydraulic pressure is a value estimated from actual MG torque.

At step S6, integrated controller 10 executes a control process in which the feedback (FB) controlled variable is added to a feed-forward (FF) controlled variable as a command hydraulic pressure to second clutch CL2. In other words, if a deviation between the target MG torque and the actual MG torque is present, the controlled variable in accordance with the deviation is added. That is to say, in a case where the target MG torque is not coincident with the actual MG torque, the command hydraulic pressure which is further reduced in accordance with the deviation is outputted. The reason for the addition of the feedback controlled variable is that it is difficult to discriminate that the actual MG torque does not follow the target MG torque merely due to an insufficient reduction of the actual hydraulic pressure or due to a complete released state of second clutch CL2 (the complete released state refers to a state in which the piston of the clutch is furthermore moved toward the released side from a state in which the clutch transmission torque capacity is approximately zero).

At a step S7, integrated controller 10 counts up a feedback response timer.

At a step S8, integrated controller 10 determines whether the feedback response timer value is equal to or larger than a response time. If Yes at step S8, the routine goes to a step S9. If No at step S8, the routine goes to step S16. That is to say, during the count up of this timer, the reduced command hydraulic pressure is outputted if the deviation between the target MG torque and the actual MG torque is present.

At step S9, integrated controller 10 determines whether a difference between the actual MG torque and the target MG torque is equal to or larger than a return determination value. If this difference is equal to or larger than the return determination value, the routine returns to a step S14. Otherwise, the routine goes to a step S10. It should be noted that the return determination value is a predetermined value representing that the actual MG torque is returned to the target MG torque when considering the dispersions and so forth. The reason that this step of S9 will be described when steps S14 and S15 are explained.

At step S10, integrated controller 10 determines whether an absolute value of the difference between the actual MG torque and the target MG torque is smaller than a follow-up determination value. If Yes at step S10, the routine goes to a step S11. If No at step S10, the routine goes to step S16. At step S11, integrated controller 10 counts up the follow-up determination timer.

At step S12, integrated controller 10 determines whether the follow-up determination timer value is equal to or larger than a follow-up time (duration). If Yes art step S12, the routine goes to a step S13. If No at step S12, the routine goes to step S16. That is to say, if second clutch CL2 has the transmission torque capacity, the actual MG torque is to be varied following the reduction in the command hydraulic pressure when the command hydraulic pressure is reduced. Hence, in a case where the target MG torque and the actual MG torque are present for the follow-up time or more in a range in which the actual MG torque is thought to follow the target MG torque, it means that second clutch CL2 does not yet fall into the completely released (complete release) state.

At a step S13, each timer value is cleared. That is to say, the step S13 means that a preparation to again reduce the command hydraulic pressure in the stepwise manner.

At step S14, integrated controller 10 counts up the return determination timer. At a step S15, integrated controller 10 determines whether the return determination timer value is equal to or larger than a return time. If Yes at step S15, the routine goes to a step S17. If No at step S15, the routine goes to step S10. That is to say, if the load on motor/generator MG is reduced when the command hydraulic pressure is reduced according to the feedback control, the actual MG torque is to return to the target MG torque. On the other hand, if second clutch CL2 is in the released state, the actual MG torque is not returned to the target MG torque even how much the command hydraulic pressure is reduced. That is to say, it means that second clutch CL2 is already completely released. The command hydraulic pressure at this time point is an end command hydraulic pressure.

At step S16, integrated controller 10 determines whether a correction (this corrective control process) continuation condition is established. If integrated controller 10 determines that the continuation condition is established at step S16 (Yes), the routine goes to step S2 to execute continuously the above-described control process. If not determined (No) at step S16, the present routine is ended. The correction continuation condition is generally the same as the (corrective control) start condition. A hysterisis is provided for each of threshold values and so forth so that a control hunting is avoided.

In addition, in a case where the control mode is transferred from the motor ISC control to the engine ISC control, the above-described control routine in FIGS. 11A and 11B is promptly ended. This is because, when the revolution speed control by means of motor/generator MG is changed to the revolution speed control by means of engine E, the modifications of the ignition timing and intake air quantity are made so that the variation in the engine load occurs. Therefore, the determination cannot be made of whether this is the variation in the MG torque due to the change in second clutch CL2 or due to the variation in the engine load.

[Post-correction Supply Hydraulic Pressure Setting Process]

Figure 12:
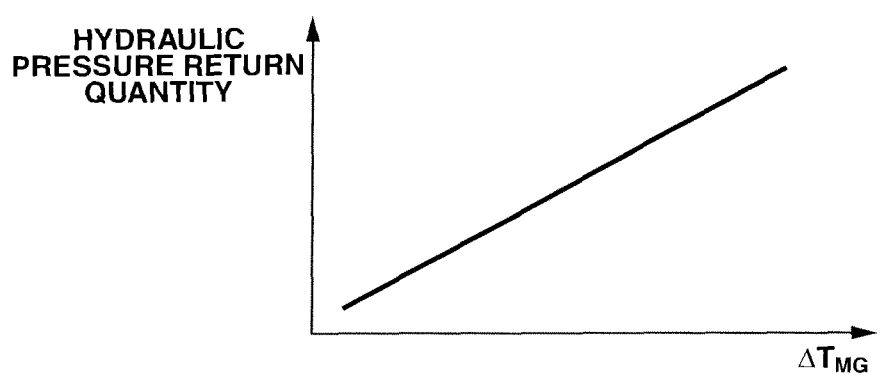
FIG. 12 is a map view representing a hydraulic pressure return quantity in the preferred embodiment shown in FIG. 1.
Figure 13:
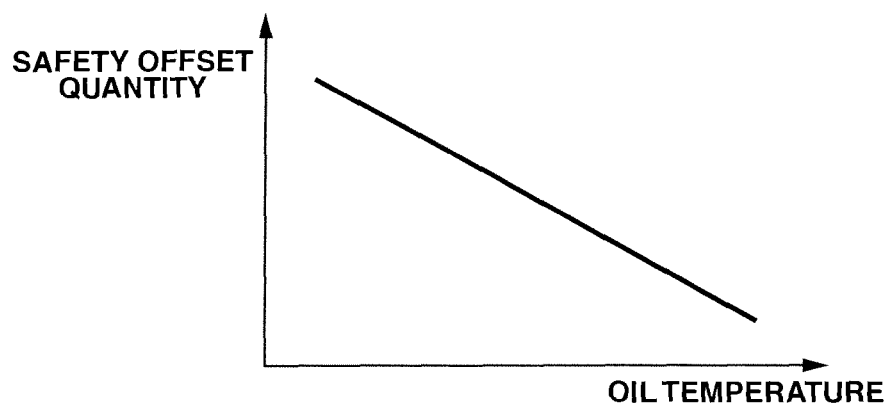
FIG. 13 is a map view representing a safety offset quantity in the preferred embodiment shown in FIG. 1.

At step S17, integrated controller 10 executes a post-correction supply hydraulic pressure setting process and sets a post-correction command hydraulic pressure. It should be noted that the post-correction supply is hydraulic pressure setting process is a process in which the command hydraulic pressure is corrected to a marginal value (or a state in which second clutch CL2 have a slight quantity of transmission torque capacity) at which second clutch CL2 is started to have the transmission torque capacity. FIG. 12 shows a map representing a hydraulic pressure return quantity in this embodiment. FIG. 13 shows a safety offset quantity in this embodiment. It should be noted that these maps shown in FIGS. 12 and 13 are set on a basis of a variation quantity of $\Delta T_{MG}$. Variation quantity $\Delta T_{MG}$ is a deviation between the actual MG torque at a time point at which the return determination timer value has indicated the passage of the return time and the actual MG torque when the actual MG torque is, at a previous routine, determined to follow the target MG torque. Oil temperature shown in FIG. 13 refers to a working oil temperature. As the oil temperature becomes lower, the safety offset quantity becomes larger (namely, the post-correction hydraulic pressure becomes higher).

In addition, the hydraulic pressure return quantity is the quantity by which the subtraction correction is made from the command hydraulic pressure (hereinafter, referred to as a previous command hydraulic pressure) when determining, at the previous routine, that the actual MG torque follows the target MG torque and is set on a basis of variation quantity $\Delta T_{MG}$.

This subtraction corrected command hydraulic pressure corresponds to an estimated post-correction command hydraulic pressure. When variation quantity $\Delta T_{MG}$ is large, it means that, although second clutch CL2 has the transmission torque capacity to some extent, second clutch is thereafter released. Since the previous command hydraulic pressure is excessively high, the command hydraulic pressure is largely corrected. On the other hand, if variation quantity $\Delta T_{MG}$ is small, the transmission torque capacity becomes immediately eliminated when the transmission torque capacity is reduced in the stepwise manner. The previous command hydraulic pressure is a value in the vicinity to the appropriate value so that the small subtraction correction is made.

Next, (at step S17) the final post-correction command hydraulic pressure is determined with the safety offset quantity added to this corrected value of the command hydraulic pressure. The safety offset quantity is a value set in accordance with an oil temperature and is set to be higher as the oil temperature becomes lower. On the other hand, when the oil temperature is low, a viscosity of oil is high and a controlablity is unfavorable. Hence, a large safety offset quantity is set to secure the transmission torque capacity.

On the other hand, when the oil temperature is high, the viscosity of oil is not so high. Hence, a small safety offset quantity is set. After the post-correction command hydraulic pressure is set, the command hydraulic pressure is augmented by a preset (predetermined) gradient toward the post-correction command hydraulic pressure from the command hydraulic pressure when the return determination timer value reaches to the return time.

(Action According to the Vehicle Stop Time Transmission Torque Capacity Corrective Control Process)

Figure 14:
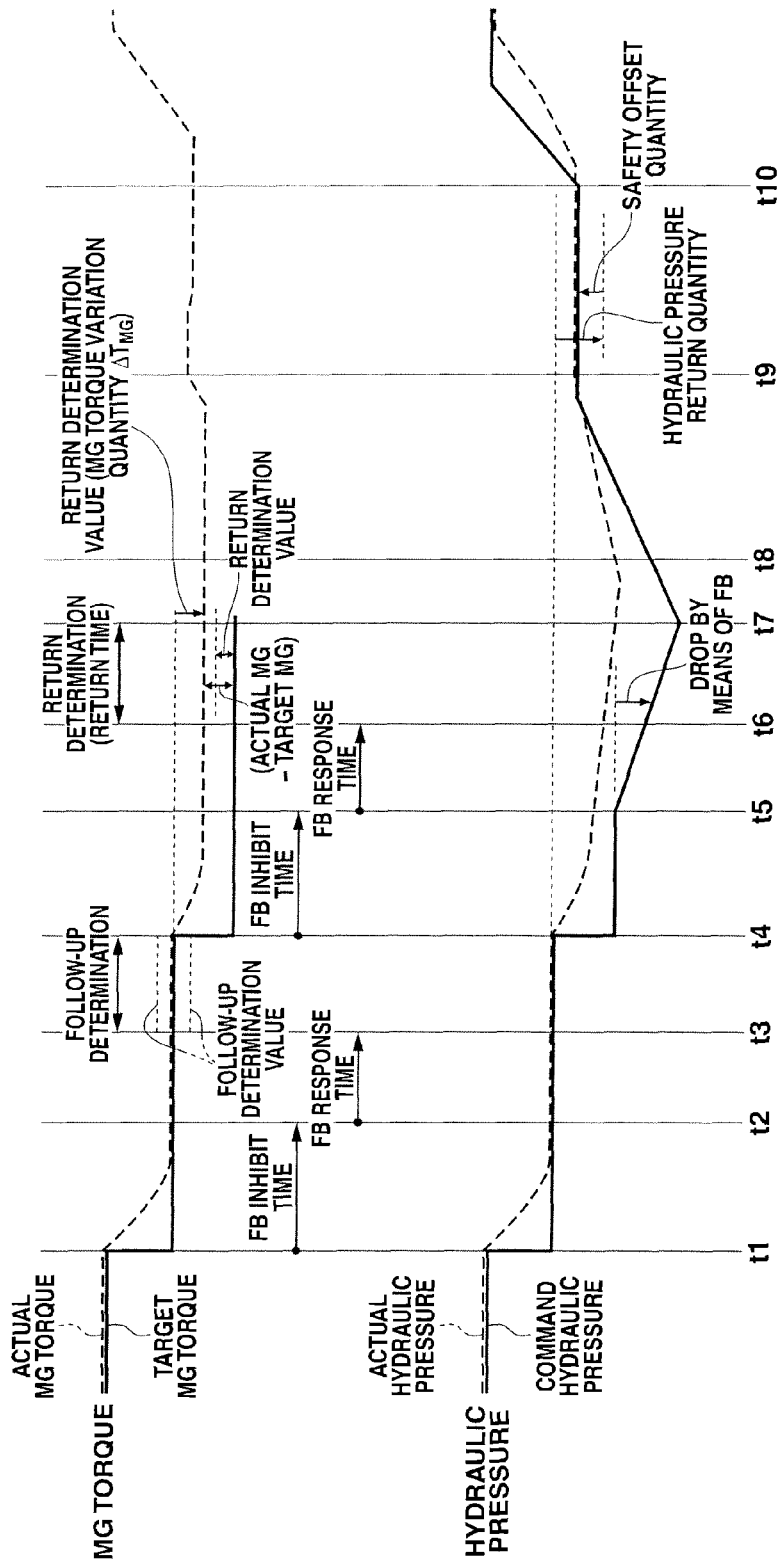
FIG. 14 is a timing chart representing the vehicle stop time transmission torque capacity correction control process in the preferred embodiment shown in FIG. 1.

FIG. 14 shows a timing chart representing the vehicle stop time transmission torque capacity corrective control process in the embodiment described above. The initial condition is that the WSC traveling mode is selected, the brake pedal is depressed, the accelerator pedal is in the off state (released state), the vehicle is stopped, and the motor ISC control is continuously executed.

When, at a time point t1, integrated controller 10 determines that the correction (corrective control) start condition is established, the command hydraulic pressure is reduced in accordance with the stepwise subtraction quantity and the target MG torque is also reduced in accordance with the step subtraction quantity. At this time, the count up of the feedback (FB) inhibit timer is started. At a time point t2, when the feedback inhibit timer value has reached to the inhibit time, the count up of the feedback response timer is started and the addition of the feedback controlled variable is started. At this time, since the deviation between the target MG torque and the actual MG torque is approximately converged (to zero), the feedback controlled variable is hardly outputted.

At a time point t3, if the feedback response timer value has indicated to have reached to the response time, the deviation between the actual MG torque and the target MG torque is small and this deviation falls in the follow-up determination value. Hence, the count up of the follow-up determination timer is started.

At a time point t4, when the follow-up determination timer value has indicated to have reached to the follow-up determination time, integrated controller 10 determines that the transmission torque capacity of second clutch CL2 is still secured and not released and resets each timer value. Furthermore, the reduction in the command hydraulic pressure and the reduction in target MG torque in accordance with the stepwise subtraction quantity are carried out so that the count up of the feedback inhibit timer is started.

At a time point t5, when the feedback inhibit timer value has reached to the inhibit time, the count up of the feedback response timer is started and the addition of the feedback controlled variable is started. At this time, since the deviation between the target MG torque and the actual MG torque occurs, the feedback controlled variable is outputted so that the command hydraulic pressure is started to be gradually reduced. In this case, since second clutch CL2 is completely released, the clutch piston is started to be stroked toward the release side.

At a time point t6, when the feedback response timer value has indicated to have reached to the response time, the count up of the return determination timer is started since the deviation between the actual MG torque and the target MG torque is larger than the return determination value.

At a time point t7, when the return determination timer value has indicated to have reached to the return time, the deviation between the actual MG torque and the target MG torque is still equal to or larger than the return determination value. Hence, variation quantity $\Delta T_{MG}$ at this time point is stored so that the command hydraulic pressure at this time point is raised on a basis of a preset torque occurrence gradient. At this time point, the command hydraulic pressure is raised to reach to the post-correction command hydraulic pressure. The post-correction command hydraulic pressure is set to a value to which a safety offset value is added after the hydraulic pressure return quantity is subtracted from the previous command hydraulic pressure (the command hydraulic pressure when the actual MG torque is previously determined to follow the target MG torque). Thus, the actual hydraulic pressure is also gradually raised. When, along with the rise in the actual hydraulic pressure, second clutch CL2 is started to have the transmission torque capacity, the load on the motor/generator MG in accordance with the transmission torque capacity of second clutch CL2 is started to be acted. Hence, the actual MG torque is accordingly raised.

At a time point t9, when the actual hydraulic pressure reaches to the post-correction command hydraulic pressure, second clutch CL2 achieves a state in which second clutch CL2 has a slight transmission torque capacity.

At a time point t10, when the vehicle driver releases the brake pedal and depresses the accelerator pedal, the target driving torque is raised and the command hydraulic pressure is accordingly raised. At this time, since second clutch CL2 is controlled to the marginal value at which second clutch CL2 is started to have the transmission torque capacity. Hence, the vehicle can promptly be started.

As described hereinabove, the control apparatus in this embodiment can achieve the following action and advantages.

(1) The hybrid vehicle for the vehicle comprises: motor/generator MG (a driving source) which outputs a driving force of the vehicle; second clutch CL2 (the clutch) interposed between the driving source and the driving wheels of the vehicle to generate the transmission torque capacity on a basis of the command hydraulic pressure; the WSC traveling mode (the traveling mode) in which the slip control is performed for the clutch and the revolution speed control is performed for the driving source such that the revolution speed of the clutch at a driving source side thereof becomes higher than that at a driving wheel side thereof by a predetermined revolution speed; step S1 (a vehicle stop state determining means (section)) configured to determine a vehicle stopped state; motor controller 2 (torque detecting means (section)) configured to detect an actual torque of motor/generator MG; and the vehicle stop-time transmission torque capacity corrective control process (vehicle stop-time transmission torque capacity correcting means (section)) configured to reduce the command hydraulic pressure from the initial command hydraulic pressure and to set the command hydraulic pressure to the post-correction command hydraulic pressure on a basis of the command hydraulic pressure when the actual torque variation of motor/generator MG (the actual torque of motor) is determined to be ended along with the reduction of the command hydraulic pressure, when the determination of the vehicle stopped state is made during the WSC traveling mode.

Hence, the transmission torque capacity of second clutch CL2 can be reduced and the heat generation and deterioration of the clutch plates thereof can be suppressed.

(2) The driving source is motor/generator MG (motor) and the actual torque is the actual MG torque. Hence, the torque variation can be detected with a high accuracy. The post-correction command hydraulic pressure can appropriately be set.

(3) Step S2 (target torque calculating means (section)) is provided for calculating the target MG torque (target torque) of motor/generator MG on a basis of the command hydraulic pressure. In the vehicle stop time transmission torque capacity corrective control process, the determination is made that second clutch CL2 is in the completely released state if the variation quantity of the actual MG torque is smaller than the predetermined quantity when the command hydraulic pressure is reduced by the predetermined quantity in the stepwise manner from the initial command hydraulic pressure. In this way, the stepwise subtraction can achieve the variation in the actual MG torque in the static state in a short time and the post-correction command hydraulic pressure can be set at an earlier stage. Hence, a wasteful slip of second clutch CL2 can be avoided. In addition, by making second clutch CL2 in the complete release state the post-correction command hydraulic pressure can be set with the high accuracy.

(4) In the vehicle stop-time transmission torque capacity corrective control process, as the hydraulic pressure return quantity (post-correction command hydraulic pressure), the command hydraulic pressure when second clutch CL2 is in the completely released state is estimated on a basis of variation quantity $\Delta T_{MG}$ (the variation quantity (rate) of the actual torque of the motor) and the post-correction command hydraulic pressure is set to a value returned by the hydraulic pressure return quantity from the command hydraulic pressure reduced by the predetermined quantity.

That is to say, the large variation quantity $\Delta T_{MG}$ means that second clutch CL2 has the transmission torque capacity to some extent when the command hydraulic pressure is reduced by the stepwise subtraction quantity and, thereafter, second clutch CL2 is released. Since the previous command hydraulic pressure is too high, the large subtraction correction is carried out for the post-correction command hydraulic pressure.

On the other hand, when variation quantity $\Delta T_{MG}$ is small, the transmission torque capacity of second clutch CL2 is immediately nullified when the post-correction command hydraulic pressure is subtracted in the stepwise manner. Since the previous command hydraulic pressure is a value near to an appropriate value, the small subtraction correction is carried out for the post-correction command hydraulic pressure. As described above, since the hydraulic pressure return quantity is set on a basis of variation quantity $\Delta T_{MG}$, an optimum post-correction command hydraulic pressure can be set.

(5) The safety offset quantity (post-correction command hydraulic pressure) is set to be higher as the oil temperature becomes lower. Since the oil viscosity is high and controllability is unfavorable when the oil temperature is low. Hence, since the large safety offset quantity is set in order to secure the transmission torque capacity, an appropriate transmission torque capacity can be secured.

As described hereinabove, the present invention has been explained on a basis of the preferred embodiment. However, the specific structure may be another structure than the embodiment shown in the drawings. For example, the preferred embodiment is applicable to the hybrid vehicle. However, the present invention is applicable to another type of vehicle in which a start clutch is equipped. In addition, in the preferred embodiment, FR (Front engine rear drive) type hybrid vehicle has been explained. However, the present invention is applicable to an FF (Front Engine Front Drive) type hybrid vehicle.

Furthermore, in the embodiment, the vehicle-stop time transmission torque capacity corrective control process is executed when the WSC traveling mode is carried out. However, this corrective control process may similarly be executed during the execution of another slip control, namely, when the revolution speed control for motor/generator MG is executed.

According to the present invention, the transmission torque capacity of the clutch can be reduced so that the heat generation of the clutch plates and the deterioration of the clutch plates can be suppressed. In addition, the hydraulic pressure when the clutch (CL2) is in the completely released state is confirmed on a basis of the variation in the actual torque (actual MG torque) of the driving source and the post-correction command hydraulic pressure is set on a basis of the hydraulic pressure at the time when the clutch (CL2) is in the completely released state. Hence, the time lag to generate the transmission torque capacity at the time of the vehicle start is made small and the engagement shock which would occur at the time of the vehicle start can be reduced. Consequently, the drive-ability of the vehicle can be improved.

This application is based on a prior Japanese Patent Application No. 2010-245721 filed in Japan on Nov. 1, 2010. The entire contents of this Japanese Patent Application No. 2010-245721 are hereby incorporated by reference. Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for a vehicle, comprising:
    a driving source which is configured to output a driving force to the vehicle;
    a clutch interposed between the driving source and driving wheels of the vehicle to generate a transmission torque capacity on a basis of a command hydraulic pressure;
    a traveling mode in which a slip control is performed for the clutch and a revolution speed control is performed for the driving source such that a revolution speed at a driving source side of the clutch becomes higher than a revolution speed at a driving wheel side of the clutch by a predetermined revolution speed;
    a vehicle stop state determining section configured to determine a vehicle stopped state;
    a torque detecting section configured to detect an actual torque of the driving source; and
    a vehicle stop-time transmission torque capacity correcting section configured to reduce the command hydraulic pressure from an initial command hydraulic pressure,
        set a post-correction command hydraulic pressure on a basis of the command hydraulic pressure when a variation in the actual torque of the driving source accompanied by a reduction of the command hydraulic pressure is determined by the torque detection section to be over,
        whereby a completely released state of the clutch is confirmed, when the vehicle stopped state is determined to occur during the traveling mode.

2. The control apparatus for the vehicle as claimed in claim 1, wherein the driving source is a motor and the actual torque is an actual torque of the motor.

3. The control apparatus for the vehicle as claimed in claim 2, wherein the control apparatus further comprises a target torque calculating section configured to calculate a target torque of the motor on a basis of the command hydraulic pressure, and wherein the vehicle stop-time transmission torque capacity correcting section is configured to determine that the clutch is in the completely released state when a variation quantity of the actual torque of the motor is smaller than a variation quantity of the target torque of the motor by a predetermined quantity, when the command hydraulic pressure is reduced in a stepwise manner from the initial command hydraulic pressure by the predetermined quantity.

4. The control apparatus for the vehicle as claimed in claim 3, wherein the vehicle stop-time transmission torque capacity correcting section is configured to:

estimate the command hydraulic pressure when the clutch is in the completely released state to be the post-correction command hydraulic pressure on a basis of the variation quantity of the actual motor torque, and return the hydraulic pressure from the command hydraulic pressure reduced by the predetermined quantity to the post-correction command hydraulic pressure.

5. The control apparatus for the vehicle as claimed in claim 4, wherein the post-correction command hydraulic pressure is set to be higher as an oil temperature becomes lower.

6. The control apparatus for the vehicle as claimed in claim 4, wherein the command hydraulic pressure is set to the post-correction command hydraulic pressure to which a safety offset quantity is added after a hydraulic pressure return quantity is subtracted from a previous command hydraulic pressure, when a predetermined time has passed from a time at which a deviation between the actual torque of the motor and the target torque of the motor is equal to or larger than a predetermined return determination value.

7. The control apparatus for the vehicle as claimed in claim 6, wherein the previous command hydraulic pressure is the hydraulic pressure command value at a previous time when the actual torque of the motor is determined to follow the target torque of the motor.

8. The control apparatus for the vehicle as claimed in claim 6, wherein the hydraulic pressure return quantity is set on a basis of the variation quantity of the actual torque of the motor, wherein the variation quantity of the actual torque of the motor is a deviation between the actual torque of the motor when the predetermined time has passed from the time at which the deviation between the actual torque of the motor and the target torque of the motor is equal to or larger than the predetermined return determination value and the actual torque of the motor when the actual torque of the motor is previously determined to follow the target torque of the motor.

9. The control apparatus for the vehicle as claimed in claim 6, wherein the safety offset quantity is set on a basis of an oil temperature.

10. A control method for a vehicle, the vehicle comprising:

a driving source which outputs a driving force to the vehicle;

a clutch interposed between the driving source and driving wheels of the vehicle to generate a transmission torque capacity on a basis of a command hydraulic pressure; and a traveling mode in which a slip control is performed for the clutch and a revolution speed control is performed for the driving source such that a revolution speed at a driving source side of the clutch becomes higher than a revolution speed at a driving wheel side of the clutch by a predetermined revolution speed, the control method comprising:

determining a vehicle stopped state;

detecting an actual torque of the driving source; and reducing the command hydraulic pressure from an initial command hydraulic pressure and setting a post-correction command hydraulic pressure on a basis of the command hydraulic pressure when a variation in the actual torque of the driving source accompanied by a reduction of the command hydraulic pressure is determined to be over to confirm a completely released state of the clutch, when the vehicle stopped state is determined to occur during the traveling mode.

* * * * *